United States Patent
Chen et al.

(10) Patent No.: US 7,096,345 B1
(45) Date of Patent: Aug. 22, 2006

(54) DATA PROCESSING SYSTEM WITH BYPASS REORDER BUFFER HAVING NON-BYPASSABLE LOCATIONS AND COMBINED LOAD/STORE ARITHMETIC LOGIC UNIT AND PROCESSING METHOD THEREOF

(75) Inventors: Hong-Yi Hubert Chen, Fremont, CA (US); Richard Yen-Ching Lee, Hillsborough, NJ (US); Geoffrey Yung, Belmont, CA (US); Jensen Tjeng, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 424 days.

(21) Appl. No.: 10/672,774

(22) Filed: Sep. 26, 2003

(51) Int. Cl.
*G06F 9/30* (2006.01)

(52) U.S. Cl. ...................... 712/218; 712/217
(58) Field of Classification Search ......... 712/217–218
See application file for complete search history.

(56) References Cited

U.S. PATENT DOCUMENTS

| | | | |
|---|---|---|---|
| 5,497,499 A | 3/1996 | Garg et al. | |
| 5,560,032 A | 9/1996 | Nguyen et al. | |
| 5,583,804 A | 12/1996 | Seal et al. | |
| 5,701,493 A | 12/1997 | Jaggar | |
| 5,737,624 A | 4/1998 | Garg et al. | |
| 5,740,461 A | 4/1998 | Jaggar | |
| 5,809,522 A | 9/1998 | Novak et al. | |
| 5,826,055 A | 10/1998 | Wang et al. | |
| 5,832,292 A | 11/1998 | Nguyen et al. | |
| 5,926,841 A | 7/1999 | Novak et al. | |
| 5,970,241 A * | 10/1999 | Deao et al. | 712/227 |
| 6,038,653 A | 3/2000 | Nguyen et al. | |
| 6,112,019 A * | 8/2000 | Chamdani et al. | 712/214 |
| 6,131,157 A | 10/2000 | Wang et al. | |
| 6,279,101 B1 * | 8/2001 | Witt et al. | 712/215 |
| 6,282,630 B1 | 8/2001 | Nguyen et al. | |
| 6,412,064 B1 | 6/2002 | Wang et al. | |

OTHER PUBLICATIONS

Hennessy, John L. and David A. Patterson. Computer Architecture, A Quantitative Approach. Second Edition. Morgan Kaufmann: 1990. p. 97, 127, 195, 242-244, 247-249, 252, 257, and 279.*
Johnson, Mike. Superscalar Microproessor Design. Prentice Hall: 1991. p. 169.*

* cited by examiner

*Primary Examiner*—Eddie Chan
*Assistant Examiner*—Ryan Fiegle

(57) ABSTRACT

A data processing system for executing a plurality of instructions having a prescribed program order comprises a register file, a reorder buffer, and a plurality of functional units. The register file includes a plurality of registers to store data. The reorder buffer includes N buffer locations of which M buffer locations are bypassable and N–M buffer locations are non-bypassable, wherein N and M are integers and N>M. Each functional unit is capable of executing instructions regardless of the prescribed program order. The reorder buffer temporarily stores data corresponding to the plurality of instructions. When data of one of the plurality of instructions to be executed by a corresponding one of the plurality of functions units is temporarily stored in one of the M bypassable buffer locations, the reorder buffer transfers the data in one of the bypassable M buffer locations to the corresponding one of the functional units in order to execute the instruction. The register file also stores data corresponding to retired ones of the plurality of instructions.

58 Claims, 9 Drawing Sheets

DATA PROCESSING SYSTEM WITH BYPASS REORDER BUFFER HAVING NON-BYPASSABLE LOCATIONS AND COMBINED LOAD/STORE ARITHMETIC LOGIC UNIT AND PROCESSING METHOD THEREOF

FIELD

This invention relates generally to data processing systems and, more particularly, to data processing systems having a pipeline architecture capable of executing instructions out-of-order.

BACKGROUND

Many microprocessors execute instructions in pipeline stages. Typically, to issue an instruction for execution, operands for the instruction are retrieved from general purpose registers located in a register file and forwarded to an execution unit. Results from the execution unit are stored back in the register file to be used by subsequent instructions. Generally, instructions are issued for execution "in-order," i.e., in the order the instructions are fetched. If the instruction is simple, an execution unit may use one cycle to execute an instruction. As such, simple instructions can be issued and executed in the same order.

However, complex instructions may need different numbers of cycles to complete. For example, a multiply and accumulate (MAC) instruction may require three cycles to complete, whereas a simple instruction, such as an arithmetic logic unit (ALU) instruction, may only require one cycle to complete. Therefore, if a MAC instruction requiring three cycles is issued followed by an ALU instruction requiring one cycle, the ALU instruction will complete execution prior to the MAC instruction. In this manner, instructions are executed and completed "out-of-order."

Executing instructions out-of-order cause microprocessors to deal with a number of complexities that affect processing performance. For instance, if an operand needed for a current instruction depends on a result from a previously executed instruction that has not been stored back in the register file, a data dependency hazard condition exists. Under these circumstances, if the register file is accessed without the desired result being previously stored in the register file, the current instruction will use an incorrect operand and the instruction will be improperly executed. Different schemes have been implemented to handle data dependency hazards when executing instructions "out-of order."

One scheme uses a reorder buffer ("ROB") that allows instructions to be executed out-of-order. A ROB contains a plurality of locations containing entries allocated for each issued instruction. Each entry contains a field to hold the result from an executed instruction prior to being retired to the register file. A result is retired if it is a valid result for an executed instruction and it is in the process of being stored or is stored in the register file. The location of its entry is then allocated for a new result for subsequent executed instructions. Entries in the ROB maintain the order of instructions being issued, however, results from executed instructions can be stored in corresponding entries of the ROB upon completion. In this manner, using a ROB allows results to be stored as soon as they are generated, which allows for out-of-order execution of instructions. Consequently, as the results for instructions are retired, new entries are allocated in the ROB for additional issued instructions.

To handle a data dependency hazard, a microprocessor with a ROB can read an operand from either the register file directly if the operand is stored in the register file or FINNEGAN from the ROB if the operand was generated but not retired to the register file, thereby "bypassing" the register file. For example, if a second ALU instruction requires the result of a previously executed first ALU instruction and that result is in the microprocessor can obtain the result for the second ALU instruction directly from the ROB (assuming the result of the first ALU instruction is stored in the ROB) instead of waiting for it to be stored in the register file first. In other words, the microprocessor can bypass the register file to obtain the result for the second ALU instruction if stored in the ROB. As a result, waiting for data to be available in the register file can be avoided. Consequently, in this process, a check is required to determine if each entry in the ROB contains a result that can be used as an operand for the current instruction.

Prior microprocessor systems that use a ROB to perform out-of-order execution require a large ROB, e.g., having 32 to 64 entries. There are disadvantages to using such a large ROB for a microprocessor. In particular, if a ROB contains a large number of entries, processing overhead is extensive for instructions that are dependent on a result from a previous instruction. This is because the microprocessor must provide a data bypass for each entry in the large ROB. Furthermore, access to a large ROB for reading and writing data requires an extensive amount of power. For many electronic devices that can process complex instructions, e.g., cellular phones or hand-held computing devices, minimizing power use is an important factor for extending battery life. In addition, executing instructions out-of-order becomes even more complex if more than one instruction is issued and executed at a time.

There exists, therefore, a need for a simpler and more efficient data processing system that executes instructions "out-of-order," without using a large ROB.

SUMMARY

According to one aspect of the invention, a data processing system for executing a plurality of instructions having a prescribed program order comprises a register file, a reorder buffer, and a plurality of functional units. The register file includes a plurality of registers to store data. The reorder buffer includes N buffer locations of which M buffer locations are bypassable and N–M buffer locations are non-bypassable, wherein N and M are integers and N>M. Each functional unit is capable of executing instructions regardless of the prescribed program order. The reorder buffer temporarily stores data corresponding to the plurality of instructions. When data of one of the plurality of instructions to be executed by a corresponding one of the plurality of functional units is temporarily stored in one of the M bypassable buffer locations, the reorder buffer transfers the in one of the bypassable M buffer locations to the corresponding one of the functional units in order to execute the instruction. The register file also data corresponding to retired ones of the plurality of instructions.

According to another aspect of the invention, a data processing system for executing a plurality of instructions having a prescribed program order comprises a register file means, a buffering means, and a plurality of functional means. The register file means includes a plurality of registers to store data. The buffering means includes N buffer locations of which M buffer locations are bypassable and N–M buffer locations are non-bypassable, wherein N and M are integers and N>M. Each functional means is capable of executing instructions regardless of the prescribed program order. The buffering means temporarily stores data corresponding to the plurality of instructions. When data of one of the plurality of instructions to be executed by a corresponding one of the plurality of functions units is temporarily stored in one of the M bypassable buffer locations, the buffering means transfers the data in one of the bypassable M buffer locations to the corresponding one of the functional means in order to execute the instruction. The register file means also stores data corresponding to retired ones of the plurality of instructions.

According to another aspect of the invention, in a processor for executing a plurality of instructions having a prescribed program order, the microprocessor comprises a register file, a reorder buffer, a plurality of execution units, and an issue logic. The register file includes a plurality of registers to store data. The reorder buffer includes N buffer locations of which M buffer locations are bypassable and N–M buffer locations are non-bypassable, wherein N and M are integers and N>M. The reorder buffer also temporarily stores data corresponding to the plurality of instructions. Each execution unit is capable of executing instructions regardless of the prescribed program order. The issue logic issues data from the register file to one of the N buffer locations, and, when data of one of the plurality of instructions to be executed by a corresponding one of the plurality of functions units is temporarily stored in one of the M bypassable buffer locations, the issue logic transfers data stored or to be stored in one of the bypassable M buffer locations to the corresponding one of the execution units in order to execute the instruction.

According to another aspect of the invention, in a processor for executing a plurality of instructions having a prescribed program order, the processor comprises a register file means, a buffering means, a plurality of execution means, and an issue logic means. The register file means includes a plurality of register means to store data. The buffering means includes N buffer locations of which M buffer locations are bypassable and N–M buffer locations are non-bypassable, wherein N and M are integers and N>M. The buffering means also temporarily stores data corresponding to the plurality of instructions. Each execution means is capable of executing instructions regardless of the prescribed program order. The issue logic means issues data from the register file means to one of the N buffer locations, and, when data of one of the plurality of instructions to be executed by a corresponding one of the plurality of execution means is temporarily stored in one of the bypassable M buffer locations, the issue logic transfers data stored or to be stored in one of the bypassable M buffer locations to the corresponding one of the execution means in order to execute the instruction.

According to another aspect of the invention, a reorder buffer for executing instructions out-of-order comprises a first-in-first-out (FIFO) buffer. The FIFO buffer has N buffer locations of which M buffer locations are bypassable and N–M buffer locations are non-bypassable, wherein N and M are integers and N>M. The FIFO buffer temporarily stores data corresponding to a plurality of instructions for execution, and, when data of one of the plurality of instructions to be executed is temporarily stored in one of the bypassable M buffer locations, the data in one of the bypassable M buffer locations is transferred to an execution unit corresponding to the instruction to be executed.

According to another aspect of the invention, a reorder buffer for executing instructions out-of-order comprises a first-in-first-out (FIFO) buffering means. The FIFO buffering means has N buffer locations of which M buffer locations are bypassable and N–M buffer locations are non-bypassable, wherein N and M are integers and N>M. The FIFO buffering means temporarily stores data corresponding to a plurality of instructions for execution, and, when data of one of the plurality of instructions to be executed is temporarily stored in one of the bypassable M buffer locations, the data in one of the bypassable M buffer locations is transferred to an execution unit corresponding the instruction to be executed.

According to another aspect of the invention, in a reorder buffer having a N buffer locations of which M buffer locations are bypassable and N–M buffer locations are non-bypassable, wherein N and M are integers and N>M, a method comprises fetching one or more instructions; decoding one or more instructions; checking if a data hazard condition exists from one of the decoded instructions; if a data hazard condition exists, checking if data is available in one of the bypassable M buffer locations for executing one of the decoded instructions; and transferring the data if available in one of the bypassable M buffer locations to an execution unit for executing one of the decoded instructions.

DRAWINGS

The accompanying drawings, which are incorporated in, and constitute a part of the specification, illustrate exemplary implementations and embodiments of the invention and, together with the detailed description, serve to explain the principles of the invention. In the drawings, FIG. 1 illustrates one example of a data processing system having a pipeline architecture with a partial bypass reorder buffer;

DETAILED DESCRIPTION

Figure 1:
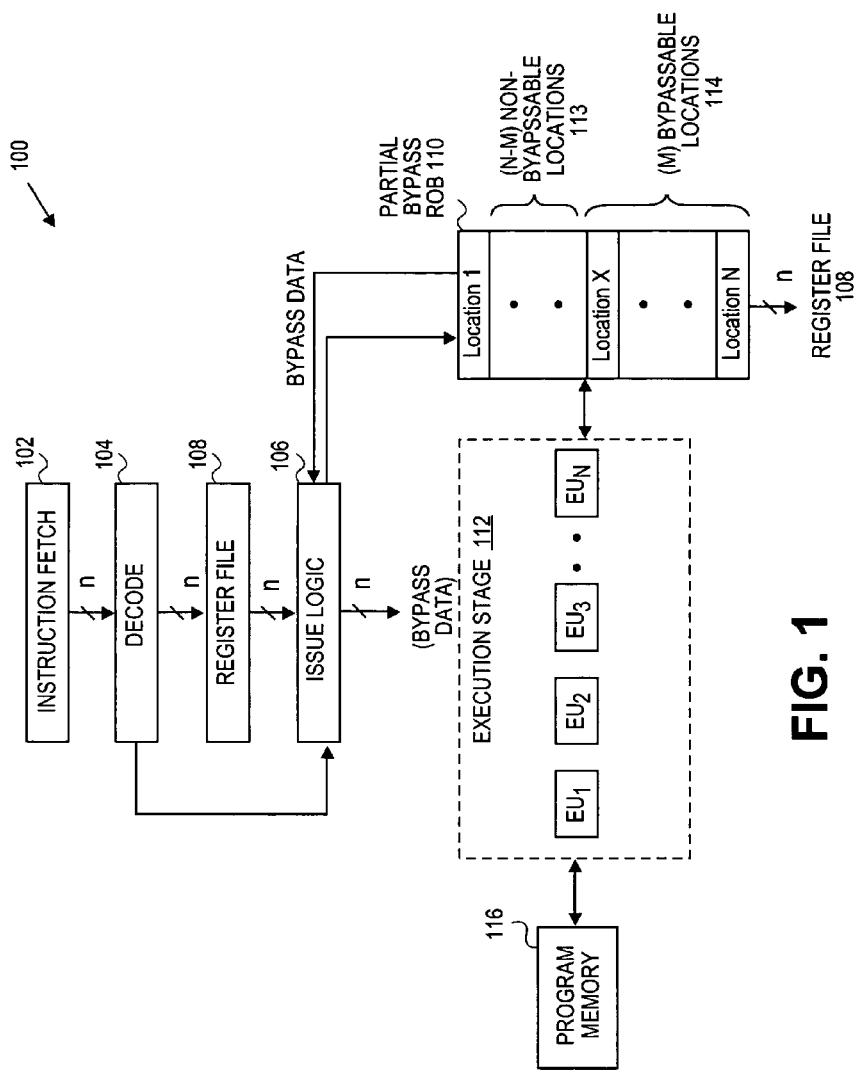

Reference will now be made in detail to exemplary implementations and embodiments of the invention, examples of which are illustrated in the accompanying drawings. Wherever possible, the same reference numbers will be used throughout the drawings to refer to the same or like parts.

A. Overview

A data processing system with a pipeline architecture is disclosed that overcomes disadvantages of prior data processing systems and provides a more efficient manner of executing instructions out-of-order. According to one example, a data processing system for executing a plurality of instructions having a prescribed program order comprises a register file, a reorder buffer (ROB), and a plurality of functional units (e.g., execution units). The register file includes a plurality of registers to store data (e.g., instruction data). The reorder buffer includes N buffer locations of which M buffer locations are bypassable and N–M buffer locations are non-bypassable, wherein N and M are integers and N>M. Each functional unit is capable of executing instructions regardless of the prescribed program order. The reorder buffer temporarily stores data corresponding to the plurality of instructions. When data of one of the plurality of instructions to be executed by a corresponding one of the plurality of functions units is temporarily stored in one of the M bypassable buffer locations, the reorder buffer transfers the data in one of the bypassable M buffer locations to the corresponding one of the functional units in order to execute the instruction. The register file also stores instruction data corresponding to retired ones of the plurality of instructions.

By using M bypassable locations in the ROB, only a subset of the locations in the ROB are used to provide a data bypass. The non-bypassable locations do not carry out a data byapss. In this manner, a data bypass applies to less number of locations, as compared to all locations of the ROB. Thus, less processing overhead is needed to execute instructions out-of-order.

According to another example, one of the functional units is a combined arithmetic logic unit (ALU) and load/store unit that saves hardware resources. Such a unit uses the same components for executing an ALU instruction and a load/store instruction. In this way, hardware need not be duplicated to perform the ALU instruction and load/store instruction. In other examples, two ALU instructions can be executed in a same cycle to further increase execution efficiency. For example, one functional unit can be a first ALU execution unit and another functional unit can be the combined ALU unit and load/store unit to perform the two ALU instructions. Because ALU instructions are the most common operations performed in a data processing system or microprocessor, execution throughput is increased further by being capable of executing multiple ALU instructions in a same cycle.

In the following description, a "data bypass" or "data bypass feature" refers to the process of forwarding data to an execution unit without having to access a register file. In one example, performing a data bypass forwards directly data, stored or to be stored in a bypassable location of a ROB, back to one of the execution units. Additionally, in the following description, when a result is "retired," the result is a valid result for an executed instruction that is ready for storage, is being stored, or is stored in a register file. The corresponding location and entry in the ROB for the retired result can be reallocated for another instruction. Furthermore, in the following description, the process of "issuing an instruction" refers to forwarding instruction data to the ROB and forwarding operands including bypass data to execution units.

B. Pipeline Architecture (In-Order Issue/Out-Of Order Execution)

FIG. 1 illustrates one example of a data processing system 100 having a pipeline architecture with a partial bypass ROB 110. The pipeline processes instructions in multiple stages. The techniques described herein can be used for processing any number of types of instructions. Additionally, the pipeline is scalable to fetch, decode and issue, and execute "N" number of instructions in any given cycle. As described in further detail below, the pipeline is capable of issuing instructions "in-order" and executing instructions "out-of-order" using partial bypass ROB 110.

Referring to FIG. 1, data processing system 100 includes a pipeline comprising an instruction fetch stage 102, a decode stage 104, a register file 108, an issue logic 106, an execution stage 112, a program memory 116, and a partial bypass ROB 110. In this example, the pipeline architecture can be implemented as an integrated circuit (IC) with any combination of components, circuits, memory devices, and bus lines.

Instruction fetch stage 102 fetches instructions from a memory device, e.g., from an internal program memory 116. Instruction fetch stage 102 forwards fetched instructions to decode stage 104 that decodes the instructions. In decoding instructions, decode stage 104 sends inputs to register file 108 and issue logic 106, which are used for obtaining operands and controlling execution of instructions. In this example, decode stage 104 can also send decoded instruction data to issue logic 106 that issues instructions (i.e., instruction data) to partial bypass ROB 110. Partial bypass ROB 110 allocates entries in buffer locations for storing instruction data from issue logic 106.

Register file 108 contains a plurality of registers that store instruction data, e.g., operands needed to execute instructions. In this example, register file 108 receives inputs from decode stage 104 to access operands in the registers and forwards the operands to issue logic 106, which forwards them to execution stage 112. Results from executed instructions retired from partial bypass ROB 110 can be stored in register file 108, in program memory 116, and, in some cases, no action is taken regarding the results from executed instructions. That is, some instructions do not require an update. The results that are stored in registers of register file 108 can be used as operands for executing subsequent instructions.

Issue logic 106 controls issuing of instructions to partial bypass ROB 110 and execution stage 112. The instructions can be issued in a prescribed order. Issue logic 106 issues instructions by forwarding instruction data from a decoded instruction to partial bypass ROB 110 and forwarding operands, which can include bypass data, to one or more execution units in execution stage 112. When forwarding instruction data to partial bypass ROB 110, an entry in a buffer location of ROB 110 is allocated for the issued instruction and instruction data. The entry contains a plurality of fields, as described in detail below, to store the instruction data. One of the fields also stores the result of the executed issued instruction in execution stage 112. When executing an issued instruction, in one example, issue logic 106 forwards operands received from register file 108 to execution stage 112. In another example, when executing an instruction and performing a data bypass, issue logic 106 receives bypass data from partial bypass ROB 110 and forwards operands including the bypass data to execution stage 112.

Execution stage 112 includes a plurality of execution units $EU_1$ through $EU_N$ that can execute instructions regardless of the prescribed order in which they are issued. Examples of execution units include arithmetic logic units (ALUs), load/store units, multiply and accumulate units (MACs), etc. Other examples of execution units include a combined load/store ALU unit that saves hardware resources and is capable of increasing instruction execution efficiency, as described in further detail below. Execution stage 112 also operates with program memory 116 to execute instructions. For example, for a load/store operation, execution stage 112 can store and load data to and from a data memory after processing an instruction using a load/store execution unit. Program memory 116 can be system memory to store or load data for executing instructions of a program.

Partial bypass ROB 110 includes a plurality of buffer locations 1 through N having entries stored therein that allow instructions to be executed "out-of-order." For example, if the entry for location 1 is allocated for an instruction to be executed by execution unit $EU_1$ that requires three cycles to complete and the entry for location 2 (not shown) is allocated for an instruction to be executed by execution unit $EU_2$ that requires one cycle to complete, the result from $EU_2$ can be stored in the entry for location 2 before the result from $EU_1$ is stored in the entry for location 1. In this way, data processing system 100 executes instructions out-of-order.

In this example, partial bypass ROB 110 includes a total of N buffer locations of which M buffer locations are bypassable (bypassable locations 114) and N–M buffer locations are non-bypassable (non-bypassable locations 113), wherein N and M are integers and N>M. Bypassable locations 114 are buffer locations configured to store "bypass data" that can be forwarded directly as operands to execution stage 112 via issue logic 106, whereas non-bypassable locations 113 are buffer locations that are not configured to forward directly data to execution stage 112 via issue logic 106.

Bypassable locations 114 thus allow execution units $EU_1$ through $EU_N$ in execution stage 112 to receive data (e.g., operands if available) directly from partial bypass ROB 112 instead of requiring access to register file 108. In this manner, bypassable locations 114 allow instructions to be executed as soon as data or operands become available in partial bypass ROB 110 without the need to access data or operands in register file 108, thereby improving throughput of data processing system 100. Additionally, in this example, data or an operand stored in non-bypassable locations 113 cannot be forwarded directly to execution stage 112 until the data or operand moves to bypassable locations 114.

Because bypassable locations 114 are only a subset of the buffer locations in partial bypass ROB 110, less number of locations are needed to provide a data bypass, as compared to all locations of partial bypass ROB 110. Thus, less processing overhead is needed to execute instructions out-of-order. Once an instruction associated with an entry in one of the buffer locations in partial bypass ROB 110 is retired, its entry is removed from the partial bypass ROB 110. The result of the entry can be stored in register file 108, stored in a different memory, or no action is taken regarding the result. Additionally, assuming register file 108 contains N write ports, partial bypass ROB 110 can retire up to N instructions to register file 108 at a time.

Each of the buffer locations in bypassable locations 114 and non-bypassable locations 113 can be allocated with an entry corresponding to an issued instruction to temporarily store its instruction data and the result of the executed issued instruction. The result can be temporarily stored in one of the fields of its corresponding entry. For example, location 1 can be allocated for an entry corresponding to an issued instruction to be executed by $EU_1$ execution unit, and location X can be allocated for an entry corresponding to an issued instruction to be executed by $EU_2$ execution, and so on. As entries in buffer locations are retired, the retired buffer location can receive a new entry. To illustrate, if the entry in location N is retired, the entry in location N–1 can be shifted down into location N. Likewise, each of the entries of buffer locations above location N–1 can be shifted down such that entries move from location 1 to location N.

The number of buffer locations in partial bypass ROB 110, and thus the number of entries, can vary depending on whether data processing system 100 is configured for a single issue implementation (issuing one instruction in a same cycle) or a dual issue implementation (issuing two instructions in a same cycle). For example, in a single issue implementation, N=4 with four buffer locations in partial bypass ROB 110 or, alternatively, in a dual issue implementation, N=7 with seven buffer locations in partial bypass ROB 110. In preferred examples, the total number of buffer locations in partial bypass ROB 110 should be small.

1. Variable Stare Pipeline Architecture

Figure 2:
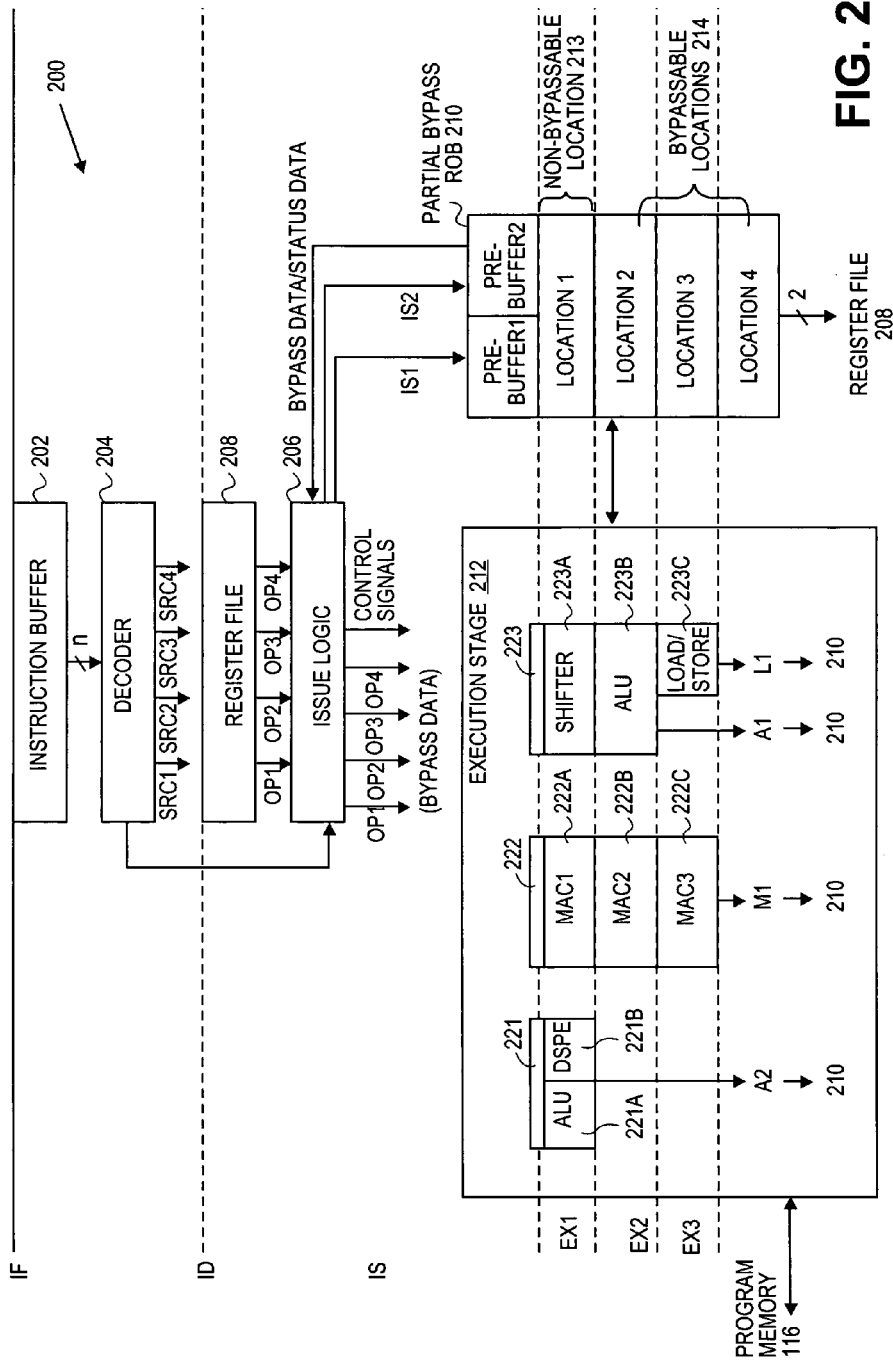
FIG. 2 illustrates one detailed example of the pipeline architecture of the data processing system of FIG. 1.

FIG. 2 illustrates an example of a pipeline architecture for a data processing system 200 that represents a more detailed implementation of data processing system 100 shown in FIG. 1. In this example, the pipeline architecture can implement a single issue or a dual issue architecture in which one or two instructions, respectively, are capable of being issued and executed at a time (i.e., in the same cycles). Nevertheless, the pipeline architecture is scalable in which "N" number of instructions are capable of being issued and executed at a time.

The pipeline architecture includes an instruction buffer 202, a decoder 204, a register file 208, an issue logic 206, a partial bypass ROB 210, and an execution stage 212. In FIG. 2, stages of the pipeline architecture are designated as the fetch stage (IF), the instruction decode stage (ID), and the issue stage (IS), with execution stages designated as, e.g., EX1 through EX3.

As shown, a plurality of instructions can be fetched and forwarded to decoder 204. In this example, decoder 204 is capable of outputting up to four source operand indexes (SRC1–SRC4) to register file 208. Register file 208 uses the source operand indexes (SRC1–SRC4) to access data (operands OP1-OP4) in appropriate registers for output to issue logic 206 that forwards operands OP1–OP4 to execution stage 212. In one example, for a single issue implementation, register file 208 is capable of accessing and outputting two operands (e.g., OP1 and OP2) for a single instruction (e.g., an ALU instruction) in one cycle. In another example, for a single issue implementation, register file 208 outputs all four operands (OP1–OP4) for a single instruction (e.g., a MAC instruction) in one cycle.

For a dual issue implementation, in one example, register file 208 outputs four operands (e.g., OP1, OP2, OP3, and OP4) in one cycle wherein two operands are needed for a first instruction and the other two operands are needed for a second instruction. For example, one instruction, such as an ALU instruction, may need operands OP1 and OP2 and another ALU instruction may need operands OP3 and OP4. All four operands for both instructions can be retrieved and forwarded to issue logic 206 that forwards them to ALU execution units in execution stage 212, thereby increasing processing throughput in data processing system 200.

Issue logic 206 receives one or more operands (OP1–OP4) from register file 208 and forwards the operands to one or more execution units in execution stage 212. Along with operands OP1–OP4, issue logic 206 receives decoded instruction data from decoder 204. Based on the received instruction data, issue logic 206 sends appropriate control signals to appropriate execution units of execution stage 212 and instruction data for issued instructions (e.g., IS1 or IS2) to PRE-BUFFER1 or PRE-BUFFER2.

Additionally, issue logic 206 can receive bypass data stored or to be stored in bypassable locations 214 in partial bypass ROB 210. Issue logic 206 can forward the bypass data as operands to one of the execution units in execution stage 208 instead of waiting for it to be stored in register file 208 and then retrieving it from register file 208. Issue logic 206 also receives status data from partial bypass ROB 210. Such data can provide information that indicate one or more entries and corresponding instructions have been retired in partial bypass ROB 210. Other information can include that a requested operand is not available in partial bypass ROB 210. In this case, issue logic 206 can send control signals to register file 208 to request the operand if available in register file 208, otherwise issue logic 206 can wait for the requested operand to be available in either register file 208 or partial bypass ROB 210.

Issue logic 206 also receives decoded instructions from decoder 204 that are issued to partial bypass ROB 210 for issued instructions (IS1 or IS2). In this way, issue logic 206 controls the issuing of instructions and operands needed by execution units in execution stage 212. For instance, if issue logic 206 determines a data dependency for an instruction, it can halt the instruction from issuing to partial bypass ROB 110 and forwarding of operands to execution stage 212 in order for the operand to be available in register file 208 or partial bypass ROB 210. In particular, if a decoded instruction received by issue logic 106 requires an operand from an issued instruction currently being executed, issue logic 206 will halt the instruction from issuing until the operand is available in register file 208 or partial bypass reorder buffer 110. Issuing of an instruction refers to allocating an entry in one of the buffer locations in partial bypass ROB 210 for the instruction and sending control signals and data to one or more execution units in execution stage 212 to execute the instruction.

For the instructions processed by data processing system 200, execution stage 212 includes four different types of execution units to execute various instructions in different numbers of cycles. Nevertheless, any number of execution units and types can be implemented in execution stage 212. This allows for a variable stage pipeline architecture. For example, execution units 221, 222, and 223 of execution stage 212 can execute different instructions in varying number of cycles.

Processing an instruction for arithmetic logic unit/digital signal processing enhancement (ALU/DSPE) unit 221, that includes an ALU unit 221A and DSPE unit 221B requires a four stage pipeline. At the instruction fetch stage (IF), an ALU instruction is fetched from instruction buffer 202 and decoded in decoder 204 at the instruction decode stage (ID). Decoder 204 outputs SRC1 and SRC2 indexes to register file 208 to obtain operands in its registers to perform the ALU operation. Specifically, at the issue stage (IS), register file 208 accesses two registers, e.g., registers R0 and R1 (not shown), based on the SRC1 and SRC2 indexes, for operands that are forwarded to issue logic 206 that issues the operands to ALU/DSPE unit 221 to perform an ALU operation, e.g., R0+R1 wherein the result A2 is designated for storage in register R2 of register file 208.

Although the result A2 is designated for the register R2 in register file 208 in the above example, it is first stored in a buffer location of an entry associated with the ALU instruction in partial bypass ROB 210 prior to being retired to register R2 in register file 208. The operands can also be used by DSPE unit 221B that generates the result A2 for digital signal processing enhancement algorithms in which saturated signed arithmetic is performed using signed fixed-point numbers. This type of arithmetic provides a closest result to a correct mathematical result used in DSP applications.

Processing an instruction for MAC unit 222 requires a six stage pipeline. At the IF, ID, and IS stages, up to four operands (OP1–OP4) can be outputted to MAC unit 222 capable of performing three MAC operations by MAC1 unit 222A, MAC2 unit 222B, and MAC3 unit 223C. A pipeline stall, however, may increase the number of cycles to complete the instruction. A MAC operation multiplies signed or unsigned operands to produce, e.g., a 32-bit result, which is then added to a third operand and written to a register in register file 208 or in a field in partial bypass ROB 210. The output or result M1 generated by the three MAC units (222A–222C) can be stored in a buffer location of an entry associated with the MAC instruction in partial bypass ROB 210.

Processing an instruction for the combined ALU and load/store unit 223 requires either five stages (if no shift is required and a memory access requires one cycle) or six or more stages (if a shift is required or a memory access requires more than one cycle). For an instruction requiring a shift and an ALU operation, at the IF, ID, and IS stages, operands can be outputted to unit 223 in order to perform the shift and ALU operation by shifter 223A and ALU unit 223B, respectively. For some ALU operations, an operand value requires bits to be shifted by a certain value, which is performed by shifter 223A and added to another operand by ALU unit 223B. The result of this shift becomes an operand to ALU unit 223B, and the result from ALU unit 223B is designated by A1 that is to be stored in a buffer location of an entry associated with the ALU instruction in partial bypass ROB 210.

A feature of execution stage 212 is that two ALU operations can be executed in a same cycle by ALU/DSPE unit 221 and combined ALU and load/store unit 223C. For example, at the IF, ID, and IS stage two ALU instructions can be issued ("dual issue") for execution in which two operands (e.g., OP1 and OP2) are outputted for execution by ALU/DSPE unit 221 to obtain the result A2 and two operands (e.g., OP3 and OP4) are outputted for execution by combined ALU and load/store unit 223C to obtain result A1. The results A2 and A1 are to be stored in buffer locations for corresponding entries in partial bypass ROB 210. The results for A2 and A1 can be retired for storage in register file 208 such that these results can be used by subsequent instructions. Because ALU instructions are the most common operations performed in a data processing system or microprocessor, execution stage 212 further increases execution throughput in data processing system 200 by being capable of executing two ALU instructions in the same cycle.

Processing an instruction for the load/store unit 223C requires five or more stages depending on if an address calculation requires a shift and whether one or more cycles are required to access memory. The load/store unit 223C generates the L1 result using the same components (i.e., shifter 223A and ALU 223B) that generates the A1 result for an ALU instruction. Thus, shifter 223A and ALU 223B do not have to be duplicated. In other words, shifter 223A and ALU 223B can be used to obtain the A1 result for an ALU instruction and the L1 result for a load/store instruction. To perform a load/store instruction, at the IF, ID, and IS stages, operands can be outputted to unit 223 in order to perform a shift and an ALU operation by shifter 223A and ALU unit 223B, respectively, in order to obtain a memory address. This address can be used to store data into the memory at the address or obtain data form the memory at the address. The result of the load/store operation is designated by result L1 (data loaded into memory or obtained from memory) is to be stored in a buffer location of an entry associated with the load/store instruction in partial bypass ROB 210.

Issuing instructions by issue logic 206 to partial bypass ROB 210 will now be explained. In this example, partial bypass ROB 210 contains N buffer locations where N=4 and M bypassable locations 214 where M=3. Partial bypass ROB 210 also includes (N−M) non-bypassable location 213 where (N−M)=1. The number of buffer locations for this example is useful for a single issue implementation, however, the number of buffer locations can be adjustable. Partial bypass ROB 210 includes two pre-buffers designated as "PRE-BUFFER1" and "PRE-BUFFER2" because partial bypass ROB 210 can support a dual issue implementation.

In this manner, issue logic 206 can issue instruction data for two instructions, designated as "IS1" and "IS2", to PRE-BUFFER1 and PRE-BUFFER2, respectively. Any number of pre-buffers, however, can be implemented in partial bypass ROB 210. Instructions can be issued to these pre-buffers only if buffer locations in partial bypass ROB 210 are available to store instruction data. Instruction data moves to partial bypass ROB 210 from the pre-buffers unconditionally as long as the instructions in the pre-buffers are valid. For example, an entry in buffer location 2 can be allocated for instruction data contained in PRE-BUFFER1, and an entry in buffer location 1 can be allocated for instruction data contained in PRE-BUFFER2.

As instructions are retired, buffer locations associated with the retired instructions can be reallocated with different entries for different instructions. For example, if the entry in buffer location 4 is retired, buffer location 4 now becomes available such that the entry in buffer location 3 can move into buffer location 4. Likewise, the entry in buffer location 2 can move into buffer location 3 and the entry in buffer location 1 can move into buffer location 2. In this manner, as entries are retired from partial bypass ROB 210, the entries move downward in the buffer locations of partial bypass ROB 210.

Figure 3:
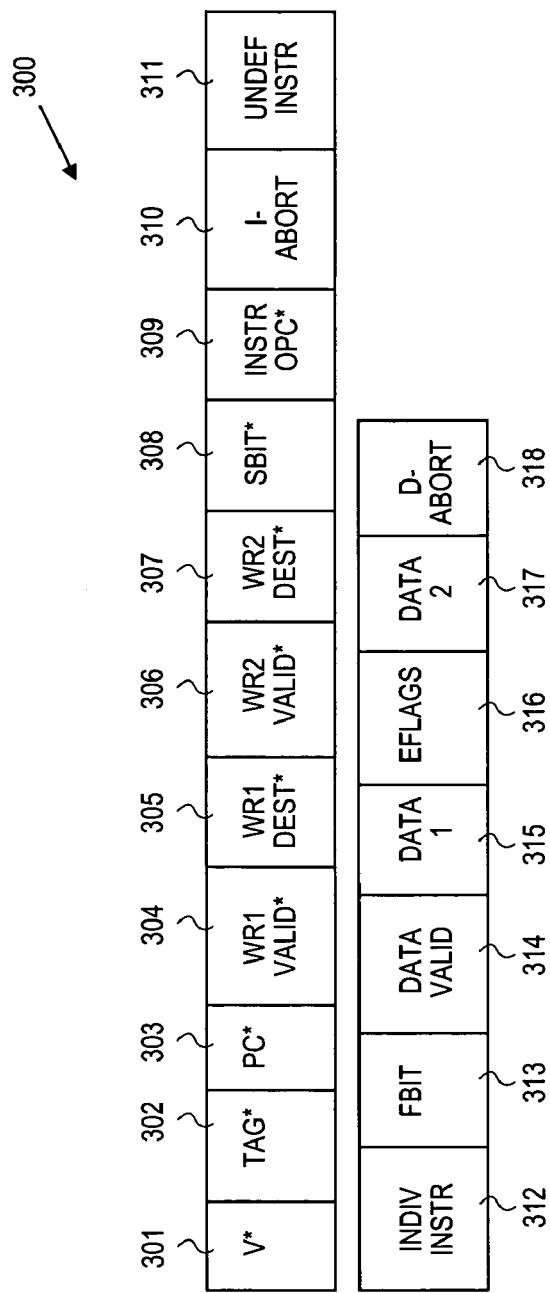
FIG. 3 illustrates one example of fields for an entry in a partial bypass ROB shown FIG. 2.

Each entry of a buffer location in partial bypass ROB 210 contains a plurality of fields. FIG. 3 illustrates one example of fields for an entry 300 for entries in partial bypass ROB 210 of FIG. 2. As shown, entry 300 includes fields 301–318. A "V" field 301 contains information that indicates whether the entry is valid. A "TAG" field 302 contains information that indicates whether the entry should receive a result from an execution unit in execution stage 212 by comparing it to an execution tag signal from an execution unit. Fields 301 and 302 are used by partial bypass ROB 210 to forward data from bypassable locations 214 to execution stage 212 via issue logic 206 when implementing a data bypass. For example, if an execution unit, e.g., execution unit 221, sends an execution tag signal along with a result to partial bypass ROB 210, partial bypass ROB 210 will store the result in the entry corresponding to the executed instruction that has a TAG field matching the tag signal and its V field 301 is valid, otherwise the result is dropped. The other fields 303–318 for entry 300 are described in the table below.

| V | ROB ENTRY VALID BIT | (1 BIT) |
|---|---|---|
| TAG | ENTRY TAG BITS TO MATCH EX TAG | (3 BITS) |
| PC | PROGRAM COUNTER INSTRUCTION ADDRESS | (31 BITS) |
| WR1 VALID | DENOTES WRITE DEST 1 IS VALID | (1 BIT) |

-continued

| WR1 DEST | INDEX OF WRITE1 DESTINATION | (4 BITS) |
|---|---|---|
| WR2 VALID | DENOTES WRITE DEST2 IS VALID | (1 BIT) |
| WR2 DEST | INDEX OF WRITE2 DESTINATION | (4 BITS) |
| S-BIT | INSTRUCTION S-BIT (S = 0 RESULTS IN NO FLAG UPDATES) | (1 BIT) |
| INSTR OPC | INSTRUCTION OPCODES-DENOTE INSTRUCTION GROUPS | (4 BITS) |
| I-ABORT | PREFETCH ABORT (INVALID FETCHED INSTR) | (1 BIT) |
| UNDEF INST | UNDEFINED INSTRUCTION EXCEPTION | (1 BIT) |
| INDIV INST | INDIVISIBLE INSTRUCTION | (1 BIT) |
| F - Bit | ENTRY - FLUSH VALID BIT | (1 BIT) |
| DATA VALID | ENTRY DATA IS VALID | (1 BIT) |
| DATA1 | DATA1 FIELD | (32 BITS) |
| EFLAGS | FLAGS | (5 BITS) |
| DATA2 | DATA2 FIELD | (32 BITS) |
| D-ABORT | MEMORY ABORT SIGNALED BY MEMORY SYSTEM | (1 BIT) |

Referring again to FIG. 2, the bottom three buffer locations (locations 2, 3, and 4) are configured as bypassable locations 214 and one buffer location (location 1) is configured as non-bypassable location 213. Although not shown, partial bypass ROB 210 contains control circuitry (described in detail below) to determine if a data bypass is to take place. In one example, the control circuitry detects a data hazard, such as a data dependency between instructions, and implements a data bypass for data stored or to be stored in bypassable locations 214.

Control circuitry in partial bypass ROB 210 implements a data bypass by forwarding data (e.g., a result from a previous executed instruction) stored or to be stored in one of the bypassable locations 214 to issue logic 206. Issue logic 206 then forwards the result directly to one or more execution units in execution stage 214. In other words, the result of the previous executed instruction is directly forwarded to the execution unit needing the result. In this manner, data can be forwarded directly to execution units 221–223 in execution stage 212 from partial bypass ROB 210 without having to access register file 208 for the data when executing an instruction.

For partial bypass ROB 210, only three buffer locations are provided as bypassable locations 214, which is well suited for a single issue pipeline architecture. Nevertheless, for a dual issue pipeline architecture, four or more buffer locations in partial bypass ROB 210 can be configured as bypassable locations 214. The number of bypassable locations 214 may also increase depending on the number of execution units being implemented in execution stage 212.

2. Register File, Issue Logic, Execution Units, and Partial Bypass ROB Control

The inputs and signals to control register file 208, issue logic 206, execution units 221–223 of execution stage 212, and partial bypass ROB 210 will now be explained, including internal components of partial bypass ROB 210.

a. Register File

Figure 4:
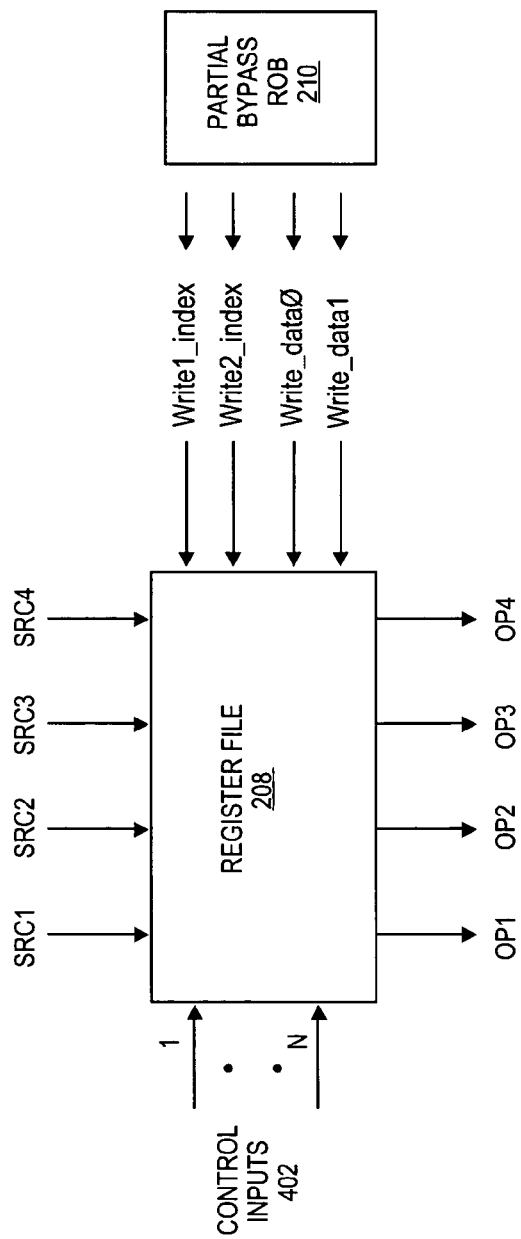
FIG. 4 illustrates in block diagram form one example of inputs and outputs for a register file shown in FIG. 2.

FIG. 4 illustrates in block diagram form one example of inputs and outputs for register file 208 of FIG. 2. In this example, register file 208 receives a plurality of control inputs 402, which can be used with source indexes (SRC1–SRC4), to access operands in registers of register file 208. According to one example, register file 208 uses control inputs 402 to determine which registers are to be accessed in various processor modes. Such control inputs 402 can be generated from other components or circuitry (not shown).

In this example, register file 208 contains four read ports capable of receiving four source indexes (SRC1–SRC4) and four output ports capable of outputting four operands (OP1–OP4). These operands are outputted to issue logic 206 that forwards them to one or more execution units in execution stage 212. For a dual issue implementation, common operations such as an ALU operation, only need two read ports. Because register file 208 includes four read ports, four operands for two ALU operations can be outputted from register file 208. For a single issue implementation, however, a less used operation such as a MAC operation may require all four read ports to output four operands in order to execute the MAC operation.

Also, in this example, register file 208 can receive data for up to two instructions being retired in partial bypass ROB 210 in the same cycle. Thus, register file 208 contains two write index ports to receive write1_index and write2_index values and two write data ports to receive write_data0 and write_data1 from partial bypass ROB 210. The write index values can be used along with the control inputs, e.g., processor mode inputs, to address a desired register in register file 208 for storing data, e.g., write_data0 or write_data1, from retired entries and instructions in partial bypass ROB 210.

b. Issue Logic

Figure 5:
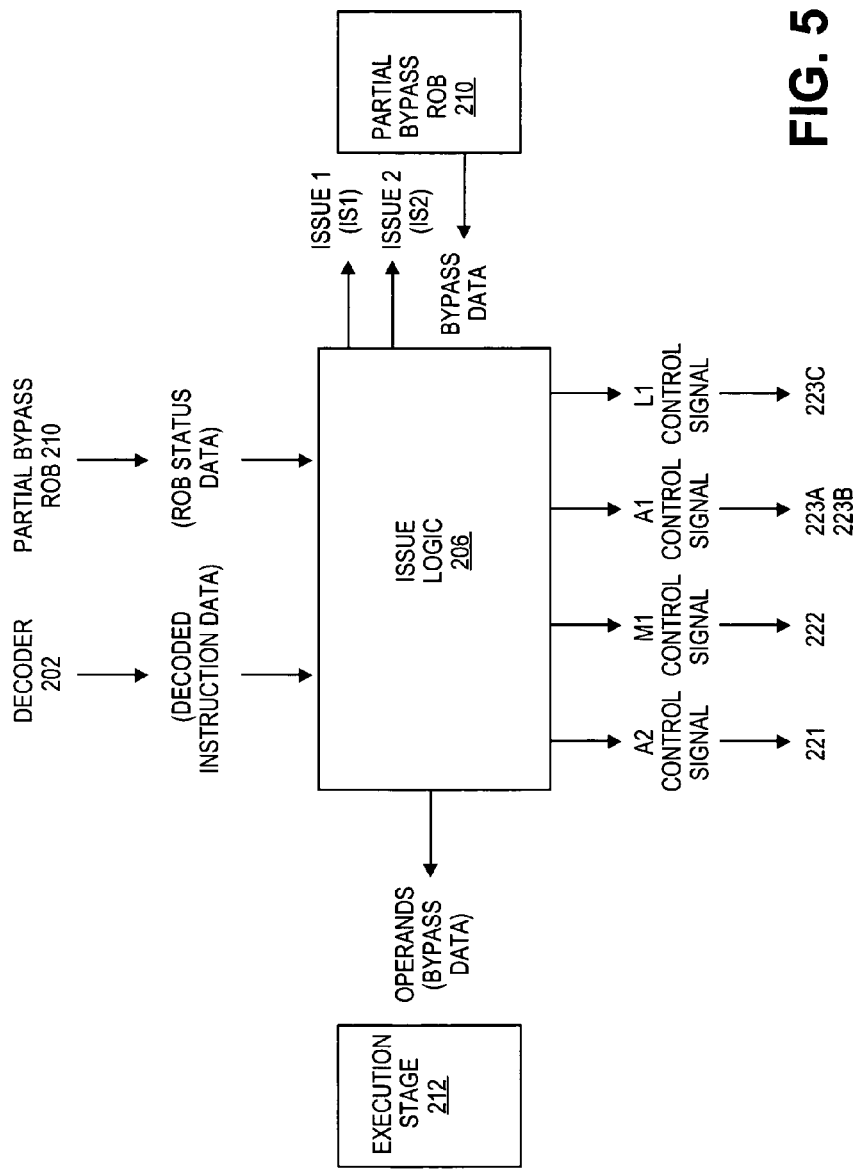
FIG. 5 illustrates in block diagram form one example of inputs and outputs for an issue logic shown in FIG. 2.

FIG. 5 illustrates in block diagram form one example of inputs and outputs for issue logic 206 of FIG. 2. As shown, issue logic 206 is capable of issuing one or two instructions (IS1 or IS2 or both) to execution stage 212 and partial bypass ROB 210. Issue logic also includes inputs to receive decoded instruction data from decoder 202 and ROB status data from partial bypass ROB 210 and output ports to output execution unit control signals: an A2 control signal to execution unit 221, an M1 control signal to execution unit 222, an A1 control signal to shifter 223A and ALU unit 223B of execution unit 223, and an L1 control signal to load/store unit 223C of execution unit 223. Other inputs include receiving bypass data from partial bypass ROB 210. Issue logic 206 also includes outputs to output operands (OP1–OP4) from register file 208 to execution stage 212, the operands can also include bypass data from partial bypass ROB 210.

The ROB status data informs issue logic 206 whether to halt issuing of instruction data to partial bypass ROB 210 and operands including bypass data to execution stage 212 based on certain conditions. For instance, if the ROB status data indicates that operands for an instruction are available in partial bypass ROB 210 and it is not full, issue logic 206 can still issue instructions, i.e., issue instruction data to partial bypass ROB 210 and forward operands and bypass data to execution stage 212. If operands are not available or partial bypass ROB is full, issue logic 206 halts issuing of instruction data, operands including bypass data.

c. Execution Units

Figure 6:
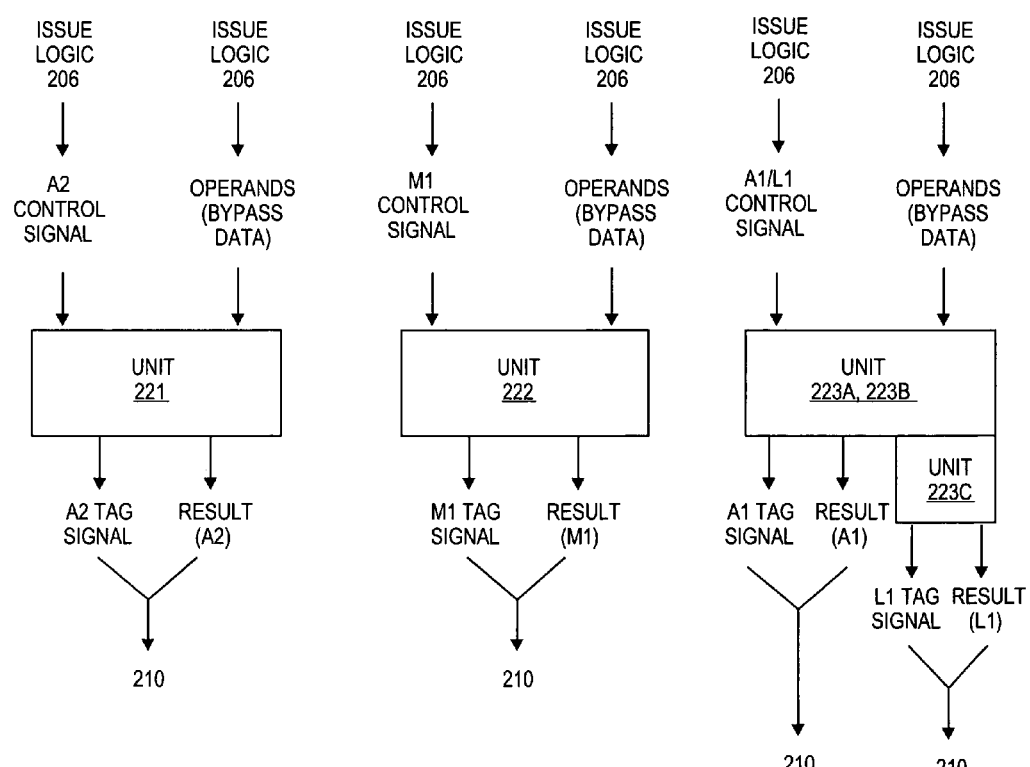
FIG. 6 illustrates in block diagram form one example of inputs and outputs for execution units shown in FIG. 2.

FIG. 6 illustrates in block diagram form one example of inputs and outputs for the execution units 221–223 of FIG. 2. Execution units 221–223 include input ports to receive the A2, M1, A1, and L1 control signals from issue logic 206 and input ports to receive operands including bypass data from issue logic 206. The control signals indicate to the respective units that data (operands including bypass data) being sent to it is valid and should be accepted. For example, if unit 221 requires data (operand) from issue logic 206, it can receive the A2 control signal that indicates to unit 221 to receive the data from issue logic 206. This data can be an operand received from register file 208 or bypass data from bypassable locations 214 in partial bypass ROB 210.

Units 221–223, after performing their respective operations, output their results (A2, M1, A1, or L1) and respective tag signals to partial bypass ROB 210. Partial bypass ROB 210 uses the tag signals to match them with a TAG field 302 in one of the entries of partial bypass ROB 210. If an entry has a TAG field 302 that matches a tag signal from an execution unit, the result from that execution unit is stored in that entry, if the entry is also valid. This process is described in more detail below.

d. Partial Bypass ROB

Figure 7:
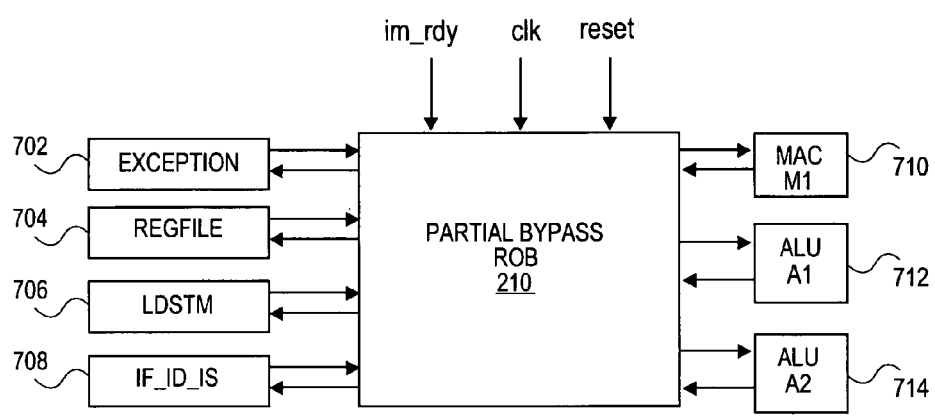
FIG. 7 illustrates in block diagram form one example of inputs and outputs for the partial bypass ROB shown in FIG. 2.

FIG. 7 illustrates in block diagram form one example of the interfaces for partial bypass ROB 210 of FIG. 2. In this example, partial bypass ROB 210 can receive a number of control signals (e.g., im_rdy, clk, and reset signals). The im_rdy signal indicates to partial bypass ROB 210 that an instruction fetch has completed. The clk signal is used for processing data in partial bypass ROB 210. The reset signal can reset data or entries in partial bypass ROB 210. Other signals (not shown) can be used by partial bypass ROB 210 to control the partial bypass operation. As shown, partial bypass ROB 210 includes an exception interface 702, a register file interface ("regfile") 704, a load/store multiple interface ("LDSTM") 706, an instruction fetch-instruction decode-issue interface ("IF_ID_IS") 708, an MAC M1 interface 710, an ALU A1 interface 712, and an ALU A2 interface 714 to communicate data and control signals.

Exception interface 702 communicates exception mode information (e.g., interrupt mode) to partial bypass ROB 210. IF_ID_IS interface 708 communicates instruction data between issue logic 206 and partial bypass ROB 210. Regfile interface 704 communicates data (i.e., results) between partial bypass ROB 210 and register file 208. For instance, data being retired for storage in register file 208 is transferred through regfile interface 704. LDSTM interface 706 communicates information to perform multiple load/store operations. For example, a control signal or information can be provided to load/store 223C through LDSTM interface 706 on the amount of data to be read or stored. MAC M1, ALU A1, and ALU A2 interfaces 710, 712, and 714, respectively, communicate data (operand) and tag signals between partial bypass ROB 210 and the execution units in execution stage 212.

Figure 8:
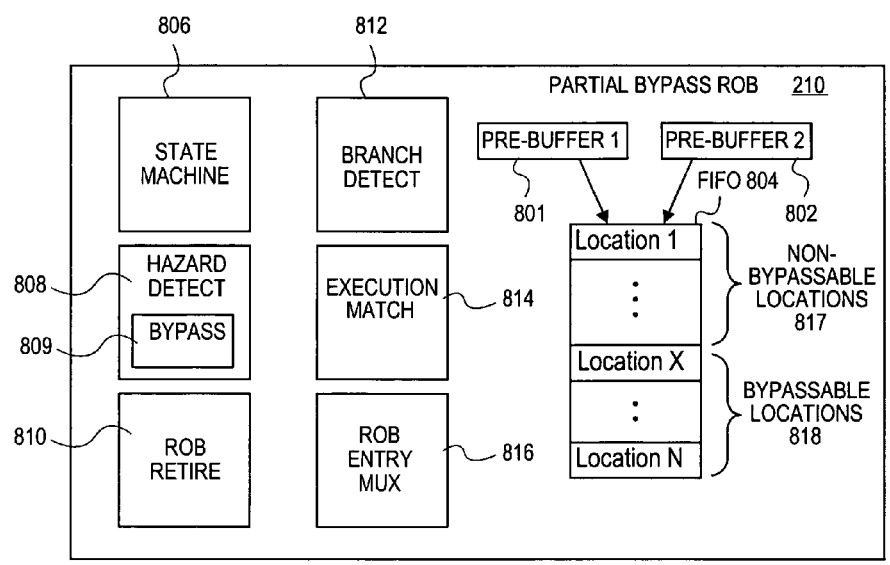
FIG. 8 illustrates one example of internal components and control circuitry of the partial bypass ROB shown in FIG. 2.

FIG. 8 illustrates one example of internal components and control circuitry of partial bypass ROB 210 of FIG. 2. In this example, partial bypass ROB 210 includes two PRE-BUFFERS 1 (801) and 2 (802) that feed instruction data into entries of N locations of a first-in-first-out (FIFO) buffer 804. In other examples, partial bypass ROB 210 may include more than two pre-buffers.

By having two pre-buffers, partial bypass ROB 210 is capable of supporting a dual issue pipeline architecture. Partial bypass ROB 210 also includes a state machine 806, hazard detect circuitry 808 with bypass circuitry 809, ROB retire circuitry 810, branch detect circuitry 812, execution match circuitry 814, ROB entry MUX circuitry 816. Other circuitry may be included in partial bypass ROB 210 and in FIFO buffer 804.

State machine 806 manages and allocates entries in locations 1 through N of FIFO buffer 804 for instruction data in PRE-BUFFERS 1 or 2. State machine 806 determines whether certain buffer locations are empty or occupied with a valid entry by examining its "V" field, and can further determine which buffer locations to place new instruction data for an entry associated with an issued instruction. State machine 806 can track if instruction data has been transferred to entries in buffer locations 1 through N of FIFO buffer 804. State machine 806 can also use signals (not shown) to send ROB status data to issue logic 206.

Branch detect circuitry 812 is configured to detect branch instruction data for partial bypass ROB 210 and then resolve whether a branch is taken or not. A branch is an instruction that jumps to a new program counter (PC) address in program memory. Branch detect circuitry 812 resolves a branch when any of the following conditions exist: (1) when branch instruction data occupies the bottom two buffer locations in FIFO buffer 804, i.e., location N and location N−1 and flags are ready; (2) when most recent flags are ready and branch instruction data is in one of the pre-fetch buffers (PRE-BUFFER1 or PRE-BUFFER2); or (3) when the branch instruction follows an ALU A2 instruction that updates flags. Other conditions can be used to resolve branches. Other conditions may be used to resolve branches. For example, if any of the above conditions exist and the branch is taken (i.e., the jump is taken), branch detect circuitry 812 flushes entries in the buffer locations above the buffer location having the branch. The flushed entries of FIFO buffer 804 have its V fields 301 reset.

Hazard detect circuitry 808 detects a data hazard, examples of which include detecting a data dependency. For example, if any operands for an instruction to be issued depend on a result from a previous instruction that has not been retired to register file 208 or stored in FIFO buffer 804 or in non-bypassable locations 817, a data hazard has occurred. In this case, hazard detect circuitry 808 will forward a signal to issue logic 206 through IF_ID_IS interface 708 to hold the pipeline such that no instruction data is forwarded to partial bypass ROB 210. In this example, a check can be made in both non-bypassable locations 818 and bypassable locations 818 to determine if the requested operand is to be stored or is stored in a buffer location of bypassable locations 818. If so, bypass circuitry 809 forwards the requested operand to issue logic 206 as "bypass data," which can then be directly forwarded to one or more execution units in execution stage 212 as operands to execute the instruction.

More specifically, regarding the need for a data bypass, an entry for an executed instruction that has not been retired does not have its result stored in register file 208. In such a case, a subsequent instruction having a data dependency with such an executed instruction cannot retrieve the proper data from register file 208 unless the data has been updated in register file 208. Thus, to allow access to the data if available in FIFO buffer 804, a data bypass feature is implemented by bypass circuitry 809 for partial bypass ROB 210. Bypass circuitry 809 thus implements a data bypass feature such that no wait is needed for the data to be stored in the register file 208 first before it can be used if a data hazard condition exists and assuming the data is available in the bypassable partial bypass ROB 210.

The operation of a data bypass for bypass circuitry 809 will now be explained. Hazard detection circuitry 808 informs bypass circuitry 809 that a data hazard exists and that a data bypass is required. In one example, to implement the data bypass, bypass circuitry 809 checks if an entry in one of the bypassable locations 818 is valid before a data bypass is carried out. An entry is valid if it contains correct data (e.g., a valid operand) or is to receive a valid operand. To carry out a data bypass, if any operand needed for an instruction at issue logic 206 depends on a result from an entry that is valid in one of the bypassable locations 818, bypass circuitry 809 sends the operand from that entry to issue logic 207 as "bypass data." The bypass data is then forwarded directly to the execution unit in execution stage 212 that needs the operand to execute the instruction.

If the operand is in the non-bypassable locations 817, bypass circuitry 809 will not perform the data bypass, but will wait until the operand moves into one of the bypassable locations 818. In this manner, a wait is not needed for the operand to be stored in the register file 206 first. In another example, bypass circuitry 809 determines if an operand is stored or is to be stored in a valid entry of one of the bypassable locations 818. For such an operand, bypass circuitry 809 can forward it to issue logic 206 as bypass data that sends it to execution stage 212. In this manner, as an execution unit sends a result to partial bypass ROB 210, the result can be forwarded to issue logic 206 as bypass data without actually being stored in bypassable locations 818 first.

Execution match circuitry 814 detects whether an execution tag signal from an execution unit of execution stage 212 matches any of TAG fields 302 in entries of buffer locations 1 through N of FIFO buffer 804. In one example, TAG fields 302 in all entries in FIFO buffer 804 can be compared with all execution tag signals from the execution units in execution stage 212 at the same time. If tags do not match, the results associated with mismatched tags will be dropped. If tags match, the results can be stored in the entry of a buffer location of FIFO buffer 804 having a matched tag.

ROB entry mux circuitry 816 is responsible for generating and allocating entries in buffer locations of FIFO buffer 804. Circuitry 816 communicates with execution units in execution stage 212 and the other control circuitry within partial bypass ROB 210 to determine the values for fields in the entries at each clock cycle. Each entry can contain 125 bits, which includes data1 and data2 values and valid bits, etc. ROB retire circuitry 810 handles retiring of entries (i.e., results of executed instructions). For example, circuitry 810 checks whether the first two entries in locations N and N−1 are valid (having a correct result). Circuitry 810 determines whether none, one, two, etc. entries are to be retired, depending on the number write ports for register file 208, and etc.

C. Methods for Performing Bypass Using Partial Bypass ROB

Details of methods for operation of partial bypass ROB 210 and FIFO buffer 804 will now be described. Initially, during an instruction issue IS, issue logic 206 issues instruction data to either PRE-BUFFERS 1 or 2 (only one pre-buffer is used for single issue). Issue logic 206 can also send operands including bypass data to one or more execution units in execution stage 212 during the IS stage. Depending on the state of partial bypass ROB 210 and assuming single issue and only PRE-BUFFER 1 is used, ROB entry mux circuitry 816 can move instruction data from PRE-BUFFER 1 to a desired location in FIFO buffer 804 on the next clock cycle, and if the instruction data is valid in PRE-BUFFER 1. If partial bypass ROB 210 is full, the issue logic will not issue any instruction to the pre-buffers. This means that each buffer location in FIFO buffer 804 has been allocated for an entry corresponding to an instruction that has not been retired.

In one example, state machine circuitry 806 determines if FIFO buffer 804 is full when location 2 is occupied with a valid entry that has not been retired and instruction data is in PRE-BUFFER 1 is valid and there is no entry to retire from FIFO buffer 804. In this state, state machine circuitry 806 sends a full signal (e.g., as status data) to issue logic 206 through IF_ID_IS interface 708. Issue logic 206 can halt issuing of instruction data to PRE-BUFFER 1 in partial bypass ROB 210 and halt issuing operands including bypass data to execution stage 212. Instruction data in PRE-BUFFER 1 will be transferred to an allocated buffer location in the next clock cycle. Data in PRE-BUFFER 1 is not halted from being transferred to FIFO 804.

For dual issue implementation using both PRE-BUFFERS 1 and 2, if instruction data in PRE-BUFFERS 1 and 2 are valid, state machine 806 determines that FIFO buffer 804 is full when location 3 to N is occupied and there are no entries in locations of FIFO buffer 804 to retire in partial bypass ROB 210. In this state, state machine 806 sends a full signal, e.g., as status data, to issue logic 206 through IF_ID_IS interface 708. Issue logic 206 will then halt issuing of instruction data to PRE-BUFFERS 1 and 2. Instruction data in PRE-BUFFER 1 and PRE-BUFFER 2 will be transferred to allocated buffer locations in the next clock cycle. Data in PRE-BUFFER 1 and PRE-BUFFER 2 are not halted from being transferred to FIFO 804.

When one or more execution units 221–223 in execution stage 212 complete execution and output a result, the execution units send tag signals, along with the result, to execution match circuitry 814 in partial bypass ROB 210. Execution match circuitry 814 compares the tag signals "tags" (e.g., TAG field 302) in entries of FIFO buffer 804. If execution match circuitry 815 determines there is no match, execution match circuitry 814 drops the result from the execution unit. This means the result is not stored in FIFO buffer 804. In most instances, tag signals that do not match with tags in entries of FIFO buffer 804 indicate the result of the executed instruction is not valid. If there is a match, execution match circuitry 814 writes or stores the result from the execution unit in the matched entry of the corresponding location in FIFO buffer 804 and a valid bit is set high to indicate entry for the executed instruction is ready to be retired. The result can be stored in register file 208 or no update of the result is performed.

In this example, ROB retire circuitry 810 will not retire a completed and executed instruction until its corresponding entry reaches the bottom of FIFO buffer 804. In one example, only entries that reach the bottom one or two locations (N and N−1) can be retired. Retiring of entries can include storing results in register file 208 or reallocating the retired entries for new instructions. Furthermore, if N instructions are capable of being retired, for example there are enough write ports to register file 208, N instructions in partial bypass ROB 210 can be retired to register file 208.

In one example, a tag match in the entry for location N of FIFO buffer 804 indicates that the entry in location N is ready to be retired without having to write the result to the entry of location N first. This immediate indication allows the result to be directly forwarded to register file 208 if retiring requires storage in register file 208.

In another example, bypass circuitry 809 uses bypassable locations 818, e.g., referring to entries in locations N, N−1, N−2, up to location X, to allow execution units 221–223 in execution stage 212 to bypass register file 208 in order to obtain a result (e.g., operands) needed execute a current instruction. Thus, in this example, bypass circuitry 809 would not associate entries in non-bypassable locations 817 for a data bypass.

In other examples, hazard detect circuitry 808 handles different conditional instructions in a different manner. For instance, for conditional instructions, with the exception of branch instructions, hazard detect circuitry 808 will inform issue logic 206 to halt issuing of instruction data to partial bypass ROB 210 and execution units in execution state 212 if FIFO buffer 804 is not empty. Issue logic 208 also halts conditional instructions until FIFO buffer 804 is empty before it issues conditional instruction data to partial bypass ROB 210 or execution units. Once FIFO buffer 804 is empty, hazard detect circuitry 808 informs issue logic 206 to issue instruction data to PRE-BUFFERS 1 or 2 in partial bypass ROB 210 and to issue operands including bypass data to one or more execution units in partial bypass ROB 210.

In the case of a false condition, the instruction data is issued to the partial bypass ROB 210 with the false F bit 313 not set. The instruction is retired from the partial bypass ROB 210 with no action taken on the instruction data. If the condition is true, the F bit 313 in the entry corresponding to the instruction is asserted and the instruction is handled like a normal instruction. However, the next conditional instruction must still wait for the current instruction to complete before it can be issued. In this manner, issue logic 206 can halt conditional instructions with minimal processing penalty because conditional instructions occur less often than unconditional instructions.

Figure 9:
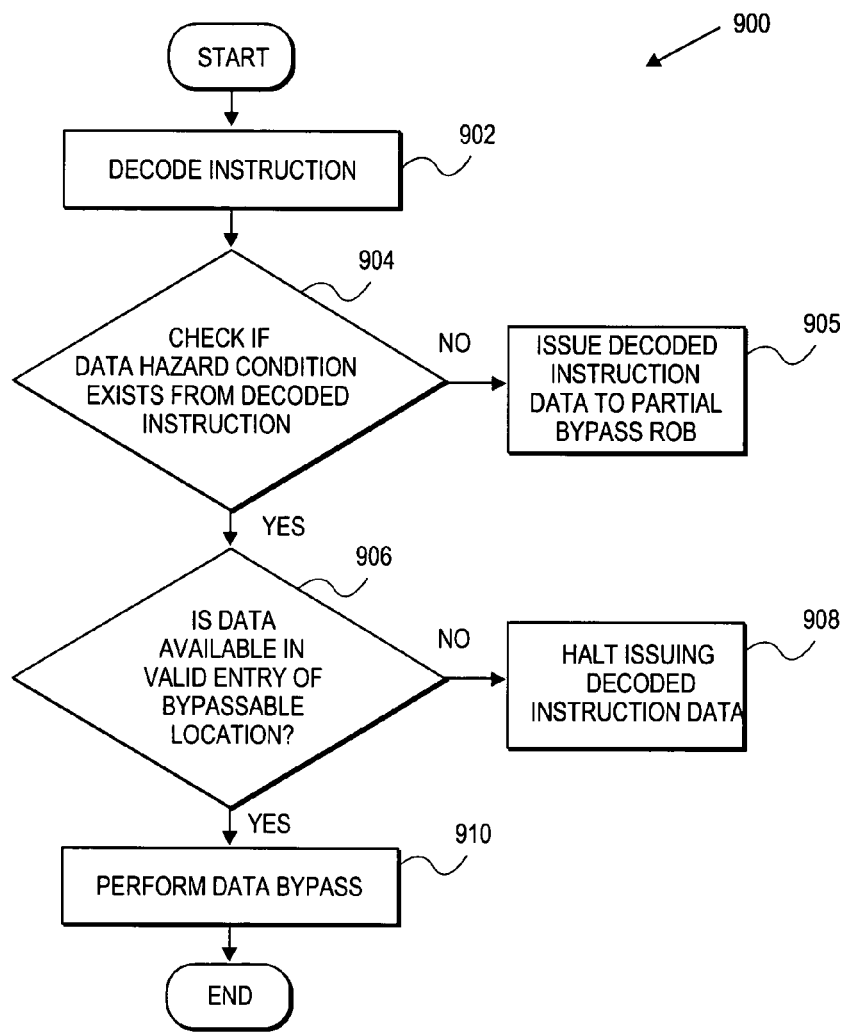
FIG. 9 illustrates one example of a flow diagram for a method to perform a data bypass using a partial bypass ROB.

FIG. 9 illustrates one example of a flow diagram for a method 900 to perform a bypass using partial bypass ROB 210. Initially, an instruction is decoded (step 902). A check is made if a data hazard condition exists from the decoded instruction (step 904). For example, hazard detect circuitry 808 in partial bypass ROB 210 can determine if a data dependency between a current instruction and previous instructions exist. In one example, hazard detect circuitry 808 detects if a current instruction in issue logic 206 contains a data hazard condition, e.g., a data dependency with a previous instruction.

If a data hazard condition does not exist, no bypass is performed and decoded instruction data is issued to partial bypass ROB 210 (step 905). For example, if hazard detect circuitry 808 does not detect a data hazard, circuitry 808 informs ROB entry mux 816 that no hazard condition exists. Thus, assuming PRE-BUFFER 1 is allowed to receive instruction data, ROB entry mux 816 can move instruction data in PRE-BUFFER 1 into an allocated entry for the instruction in one of the N locations of FIFO buffer 804.

If a data hazard condition does exist, hazard detect circuitry 808 checks if the data is available in a valid entry of bypassable locations 818 (step 906). If not, decoded instruction data is halted from issuing to PRE-BUFFERS 1 or 2 (step 908). For example, issue logic 206 can be informed by hazard detect circuitry 808 if such a condition exists and halts the issuing of instruction data. If the data is available in bypassable locations 818, a data bypass is performed (step 910). This step may also occur if the data moves from non-bypassable locations 817 into bypassable locations 818.

Thus, a data processing system having a pipeline architecture with a reorder buffer and combined load/store and arithmetic logic unit (ALU) and processing method thereof have been described. The data processing system can be implemented for general computing devices, examples of which include processors, embedded processors, microprocessors, central processing units (CPUs), application specific integrated circuit (ASICs), system on a chip (SOCs), embedded systems, micro-controllers, and other like computing devices. Moreover, the data processing system can implement pipeline architectures having multi-stage pipelines or variable stage pipelines.

Furthermore, in the foregoing specification, the invention has been described with reference to specific exemplary embodiments and implementations thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A data processing system for executing a plurality of instructions having a prescribed program order, the data processing system comprising:
    a register file including a plurality of registers to store data;
    a reorder buffer including N buffer locations of which M buffer locations are bypassable and N−M buffer locations are non-bypassable, wherein N and M are integers and N>M>0; and
    a plurality of functional units, each functional unit capable of executing instructions regardless of the prescribed program order, and
    wherein the reorder buffer temporarily stores data corresponding to the plurality of instructions and, when data of one of the plurality of instructions to be executed by a corresponding one of the plurality of functional units is temporarily stored in one of the M bypassable buffer locations, the detained one of the bypassable M buffer locations is transferred to the corresponding one of the functional units in order to execute the instruction, and
    wherein the register file also stores data corresponding to retired ones of the plurality of instructions.

2. The data processing system of claim 1, wherein the reorder buffer is a first-in first-out (FIFO) buffer having the N buffer locations, and
    wherein, as one of the plurality of instructions is retired, the data in the nth one of the N buffer locations is transferred to the register file and the detained nth−1 one of the N buffer locations is shifted to the nth one of the N buffer locations, and
    wherein, when data of one of the plurality of instructions to be executed by a corresponding one of the plurality of functional units is temporarily stored in one of the N−M non-bypassable buffer locations, the corresponding one of the plurality of functional units waits until the data of one of the plurality of instructions is shifted from the N−M nonbypassable buffer locations to the M bypassable buffer locations.

3. The data processing system of claim 2, wherein the reorder buffer comprises control circuitry to transfer the data in one of the bypassable M buffer locations to one of the functional units and to shift the detained nth−1 one of the N buffer locations.

4. The data processing system of claim 1, wherein one of the functional units includes a first arithmetic logic unit (ALU) in combination with a load/store unit sharing one or more components.

5. The data processing system of claim 4, wherein one of the functional units is a second ALU unit and wherein both the first ALU unit and the second ALU unit can execute an ALU instruction, respectively, in same cycles.

6. The data processing system of claim 1, wherein the register file includes a plurality of inputs to access data as operands to execute one of the plurality of instructions and includes a plurality of outputs to output the operands for one or more instructions in a same cycle.

7. The data processing system of claim 1, wherein the register file includes one or more write ports to receive data for storage from the reorder buffer.

8. The data processing system of claim 7, wherein the reorder buffer includes one or more output ports to send data from one or more retired instructions in the N buffer locations.

9. A data processing system for executing a plurality of instructions having a prescribed program order, the data processing system comprising:
    a register file means including a plurality of register means to store data;
    a buffering means including N buffer locations of which M buffer locations are bypassable and N−M buffer locations are non-bypassable, wherein N and M are integers and N>M>0; and
    a plurality of functional means, each functional means capable of executing instructions regardless of the prescribed program order, and
    wherein the buffering means temporarily stores data corresponding to the plurality of instructions and, when data of one of the plurality of instructions to be executed by a corresponding one of the plurality of functional means is temporarily stored in one of the M bypassable buffer locations, the data in one of the bypassable M buffer locations is transferred to the corresponding one of the functional means in order to execute the instruction, and
    wherein the register file means also stores data corresponding to retired ones of the plurality of instructions.

10. The data processing system of claim 9, wherein the reorder buffer includes a first-in first-out (FIFO) buffer means having the N buffer locations, and
    wherein, as one of the plurality of instructions is retired, the data in the nth one of the N buffer locations is transferred to the register file means and the detain the nth−1 one of the N buffer locations is shifted to the nth one of the N buffer locations, and
    wherein, when data of one of the plurality of instructions to be executed by a corresponding one of the plurality of functional means is temporarily stored in one of the N−M non-bypassable buffer locations, the corresponding one of the plurality of functional means waits until the data of one of the plurality of instructions is shifted from the N−M nonbypassable buffer locations to the M bypassable buffer locations.

11. The data processing system of claim 10, wherein the buffer means comprises circuitry means to transfer the data in one of the bypassable M buffer locations to one of the functional means and to shift data in the N buffer locations.

12. The data processing system of claim 9, wherein one of the functional means includes a first arithmetic logic unit (ALU) means in combination with a load/store means sharing one or more components.

13. The data processing system of claim 12, wherein one of the functional means is a second ALU means and wherein both the first ALU means and the second ALU means can execute an ALU instruction, respectively, in same cycles.

14. The data processing system of claim 9, wherein the register file means includes a plurality of inputs to access data as operands to execute one of the plurality of instructions and includes a plurality of outputs to output the operands for one or more instructions in a same cycle.

15. The data processing system of claim 9, wherein the register file means includes one or more write ports to receive data for storage from the buffer means.

16. The data processing system of claim 15, wherein buffer means includes one or more output ports to send data from one or more retired instructions in the N buffer locations.

17. In a processor for executing a plurality of instructions having a prescribed program order, the processor comprising:
- a register file including a plurality of registers to store instruction data;
- a reorder buffer including N buffer locations of which M buffer locations are bypassable and N−M buffer locations are non-bypassable, wherein N and M are integers and N>M>0, wherein the reorder buffer temporarily stores data corresponding to the plurality of instructions;
- a plurality of execution units, each execution unit capable of executing instructions regardless of the prescribed program order, and
- an issue logic to issue data from the register file to one of the N buffer locations and, wherein when data of one of the plurality of instructions to be executed by a corresponding one of the plurality of execution units is temporarily stored in one of the M bypassable buffer locations, the issue logic transfers data stored or to be stored in one of the bypassable M buffer locations to the corresponding one of the execution units in order to execute the instruction.

18. The processor of claim 17, wherein the register file also stores data corresponding to retired ones of the plurality of instructions.

19. The processor of claim 18, wherein the reorder buffer includes control circuitry to transfer, as one of the plurality of instructions is retired, the data in the nth one of the N buffer locations to the register file, and to shift the detained nth−1 one of the N buffer locations to the nth one of the N buffer locations.

20. The processor of claim 19, wherein the control circuitry waits when data of one of the plurality of instructions to be executed by a corresponding one of the plurality of execution units is temporarily stored in one of the non-bypassable N−M buffer locations shifts into one of the bypassable M buffer locations before transferring the data in one of the bypassable M buffer locations to the corresponding one of the plurality of execution units.

21. The processor of claim 17, wherein the control circuitry includes an execution matching circuitry that checks if a tag signal associated with an executed instruction by one of the plurality of execution units matches a tag field in one of the M buffer locations and allows a result of the executed instruction to be stored in a buffer location having a matching tag field.

22. The processor of claim 17, wherein the control circuitry further includes retire circuitry to retire data for one or more instructions in the reorder buffer to the register file.

23. The processor of claim 17, wherein the control circuitry further includes data hazard detection circuitry that detects a data hazard condition in data.

24. The processor of claim 23, wherein the control circuitry further includes bypass circuitry, wherein if a data hazard condition is detected, the bypass circuitry is capable of transferring data in one of the bypassable M buffer locations to the issue logic.

25. The processor of claim 17, wherein the issue logic issues data for one or more instructions to the reorder buffer.

26. The processor of claim of claim 17, wherein the processor is at least one of an embedded processor or a microprocessor.

27. In a processor for executing a plurality of instructions having a prescribed program order, the processor comprising:
- a register file means including a plurality of register means to store data;
- a buffering means including N buffer locations of which M buffer locations are bypassable and N−M buffer locations are non-bypassable, wherein N and M are integers and N>M>0, wherein the buffering means temporarily stores data corresponding to the plurality of instructions;
- a plurality of execution means, each execution means capable of executing instructions regardless of the prescribed program order, and
- an issue logic means to issue data from the register file means to one of the N buffer locations and, wherein when data of one of the plurality of instructions to be executed by a corresponding one of the plurality of execution means is temporarily stored in one of the M bypassable buffer locations, the issue logic means transfers data stored or to be stored in one of the bypassable M buffer locations to the corresponding one of the execution means in order to execute the instruction.

28. The processor of claim 27, wherein the register file means also stores data corresponding to retired ones of the plurality of instructions.

29. The processor of claim 28, wherein the buffering means includes control circuitry means to transfer, as one of the plurality of instructions is retired, the data in the nth one of the N buffer locations to the register file, and to shift the detained nth−1 one of the N buffer locations to the nth one of the N buffer locations.

30. The processor of claim 29, wherein the control circuitry means waits when data of one of the plurality of instructions to be executed by a corresponding one of the plurality of execution means is temporarily stored in one of the non-bypassable N−M buffer locations shifts into one of the bypassable M buffer locations before transferring the data in one of the bypassable M buffer locations to the corresponding one of the plurality of execution means.

31. The processor of claim 29, wherein the control circuitry means includes an execution matching circuitry means that checks if a tag signal associated with an executed instruction by one of the plurality of execution means matches a tag field in one of the M buffer locations and allows a result of the executed instruction to be stored in a buffer location having a matching tag field.

32. The processor of claim 27, wherein the control circuitry means further includes retire circuitry means to retire data for one or more instructions in the buffering means to the register file means.

33. The processor of claim 27, wherein the control circuitry means further includes data hazard detection circuitry means that detects a data hazard condition in data.

34. The processor of claim 33, wherein the control circuitry means further includes bypass circuitry means, wherein if a data hazard condition is detected, the bypass circuitry means is capable of transferring data in one of the bypassable M buffer locations to the issue logic means.

35. The processor of claim 27, wherein the issue logic means issues data for one or more instructions to the buffering means.

36. The processor of claim 27, wherein the processor is at least one of an embedded processor or a microprocessor.

37. A reorder buffer for executing instructions out-of-order, comprising:
- a first-in-first-out (FIFO) buffer having N buffer locations of which M buffer locations are bypassable and N−M buffer locations are non-bypassable, wherein N and M are integers and N>M>0; and wherein the FIFO buffer temporarily stores data corresponding to a plurality of instructions for execution, and, when data of one of the plurality of instructions to be executed is temporarily stored in one of the bypassable M buffer locations, the data in one of the bypassable M buffer locations is transferred to an execution unit corresponding to the instruction to be executed.

38. The reorder buffer of claim 37, further comprising:
control circuitry to transfer the data in one of the bypassable M buffer locations to the execution unit corresponding to the instruction to be executed.

39. The reorder buffer of claim 38, wherein the control circuitry, as one of the plurality of instructions is retired, transfers the data in the nth one of the N buffer locations to a register file and shifts the data in the nth−1 one of the N buffer locations to the nth one of the N buffer locations.

40. The reorder buffer of claim 39, wherein the control circuitry waits for the data to move from one of the non-bypassable N−M buffer locations into one of the bypassable M buffer locations before transferring the data.

41. The reorder buffer of claim 38, wherein the control circuitry comprises:
a state machine to determine if the reorder buffer is full or empty and to control whether any of the N buffer locations receives data.

42. The reorder buffer of claim 38, wherein the control circuitry further comprises:
a hazard detection circuitry to detect a hazard condition including a data dependency condition.

43. The reorder buffer of claim 42, wherein the control circuitry further comprises bypass circuitry to receive hazard condition information from the hazard detection circuitry and to transfer the data in one of the bypassable M buffer locations to an execution unit corresponding to the instruction to be executed.

44. The reorder buffer of claim 38, wherein the control circuitry further comprises execution match detection circuitry that detects if a tag signal from the execution unit matches a tag field in one of the bypassable M buffer locations, wherein if a match exists the execution match detect circuitry allows the bypass circuitry to transfer the data.

45. The reorder buffer of claim 38, wherein the control circuitry further comprises an entry mux circuitry to allocate entries in the N buffer locations of the reorder buffer for storing data.

46. The reorder buffer of claim 38, wherein the control circuitry further comprises retire logic circuitry to retire data for one or more instructions to a register file.

47. A reorder buffer for executing instructions out-of-order, comprising:
a first-in-first-out (FIFO) buffer means having N buffer locations of which M buffer locations are bypassable and N−M buffer locations are non-bypassable, wherein N and M are integers and N>M>0; and
wherein the FIFO buffer means temporarily stores data corresponding to a plurality of instructions for execution, and, when data of one of the plurality of instructions to be executed is temporarily stored in one of the bypassable M buffer locations, the data in one of the bypassable M buffer locations is transferred to an execution unit corresponding to the instruction to be executed.

48. The reorder buffer of claim 47, further comprising:
control circuitry means to transfer the data in one of the bypassable M buffer locations to the execution unit corresponding to the instruction to be executed.

49. The reorder buffer of claim 48, wherein the control circuitry means, as one of the plurality of instructions is retired, transfers the data in the nth one of the N buffer locations to a register file and shifts the detained nth−1 one of the N buffer locations to the nth one of the N buffer locations.

50. The reorder buffer of claim 49, wherein the control circuitry means waits for the data to move from one of the non-bypassable N−M buffer locations into one of the bypassable M buffer locations before transferring the data.

51. The reorder buffer of claim 48, wherein the control circuitry means comprises:
a state machine means to determine if the reorder buffer is full or empty and to control whether any of the N buffer locations receives data.

52. The reorder buffer of claim 48, wherein the control circuitry means further comprises: a hazard detection circuitry means to detect a hazard condition including a data dependency condition.

53. The reorder buffer of claim 52, wherein the control circuitry means further comprises bypass circuitry means to receive hazard condition information from the hazard detection circuitry means and to transfer the data in one of the bypassable M buffer locations to an execution unit corresponding to the instruction to be executed.

54. The reorder buffer of claim 48, wherein the control circuitry further comprises execution match detection circuitry means that detects if a tag signal from the execution unit matches a tag field in one of the bypassable M buffer locations, wherein if a match exists the execution match detect circuitry allows the bypass circuitry to transfer the data.

55. The reorder buffer of claim 48, wherein the control circuitry means further comprises an entry mux circuitry means to allocate entries in the N buffer locations of the reorder buffer for storing data.

56. The reorder buffer of claim 48, wherein the control circuitry means further comprises retire logic circuitry means to retire data for one or more instructions to a register file.

57. In a reorder buffer having a N buffer locations of which M buffer locations are bypassable and N−M buffer locations are non-bypassable, wherein N and M are integers and N>M>0, a method comprising:
fetching one or more instructions; decoding one or more instructions; checking if a data hazard condition exists from one of the decoded instructions;
if a data hazard condition exists, checking if data is available in one of the bypassable M buffer locations for executing one of the decoded instructions; and
transferring the data if available in one of the bypassable M buffer locations to an execution unit for executing one of the decoded instructions.

58. The method of claim 57, wherein the data hazard condition is a data dependency condition.

* * * * *

UNITED STATES PATENT AND TRADEMARK OFFICE
CERTIFICATE OF CORRECTION

PATENT NO. : 7,096,345 B1  Page 1 of 1
APPLICATION NO. : 10/672774
DATED : August 22, 2006
INVENTOR(S) : Hong-Yi Hubert Chen et al.

It is certified that error appears in the above-identified patent and that said Letters Patent is hereby corrected as shown below:

| | |
|---|---|
| Column 2, Line 4 | Delete "FINNEGAN" after "or" and before "from" |
| Column 2, Line 8 | Insert --the ROB,-- after "in" |
| Column 2, Line 58 | Insert --stores-- after "also" |
| Column 4, Line 38 | Insert --in-- after "shown" |
| Column 5, Line 24 | Delete "byapss" and insert --bypass-- |
| Column 8, Line 14 | Delete "Stare" and insert --Stage-- after "Variable" |
| Column 17, Line 57 | Insert --to-- after "needed" |
| Column 20, Line 33 | Delete "detain the" and insert --detained-- |
| Column 21, Line 62 | Delete second set of "of claim" |
| Column 24, Line 48 | Delete "a" after "having" |

Signed and Sealed this

Second Day of January, 2007

JON W. DUDAS
*Director of the United States Patent and Trademark Office*